United States Patent [19]

Aizu et al.

[11] Patent Number: 5,278,640
[45] Date of Patent: Jan. 11, 1994

[54] COLOR MODIFICATION UTILIZING TWO COEFFICIENTS

[75] Inventors: Masao Aizu, Itabashi; Mitsuhiro Hamashima; Tsutomu Nakagawa, both of Nerima; Shunsuke Mukasa, Musashino; Takashi Uchiyama, Setagaya; Haruo Wakabayashi, Asaka, all of Japan

[73] Assignee: Dai Nippon Insatsu Kabushiki Kaisha, Japan

[21] Appl. No.: 587,356

[22] Filed: Sep. 24, 1990

Related U.S. Application Data

[62] Division of Ser. No. 320,306, Mar. 6, 1989, Pat. No. 4,975,769.

[30] Foreign Application Priority Data

Jul. 6, 1987 [JP] Japan .................. 62-168212
Mar. 7, 1988 [JP] Japan .................. 63-53237
Mar. 17, 1988 [JP] Japan .................. 63-64132

[51] Int. Cl.$^5$ ............................................. H04N 1/46
[52] U.S. Cl. ............................................. 358/527
[58] Field of Search .......................... 358/80, 76, 75

[56] References Cited

U.S. PATENT DOCUMENTS 4,060,829 11/1977 Sakamoto ...................... 358/80
4,819,193 4/1989 Imao .............................. 358/80

FOREIGN PATENT DOCUMENTS

0084228 7/1983 European Pat. Off. .
225100 6/1987 European Pat. Off. ....... H04N 1/46
266186 5/1988 European Pat. Off. ....... H04N 1/46
2637055 5/1985 Fed. Rep. of Germany .
52-16403 5/1977 Japan .
55-30222 8/1980 Japan .
58-41539 9/1983 Japan .
59-171289 9/1984 Japan .
59-1227 10/1984 Japan .
60-146574 8/1985 Japan .
60-220660 11/1985 Japan .
1536220 5/1982 United Kingdom .
2202708 9/1988 United Kingdom .......... H04N 1/46

*Primary Examiner*—James J. Groody
*Assistant Examiner*—Mark R. Powell
*Attorney, Agent, or Firm*—Parkhurst, Wendel & Rossi

[57] ABSTRACT

A pictorial image comprising pixels represented by a combination of density values in respect to first color components (R, G, B) is transformed to a pictorial image comprising pixels represented by combination of density values in respect to second color components (C, M, Y). In accordance with the first color modification method, an operation expressed as $Q=\alpha P+\beta$ is implemented to an original density value P using two correction coefficients $\alpha$ and $\beta$ determined in advance to determine a density value Q after transformation. In addition, in accordance with the second color modification method, density values after transformation are determined by the calculation of the k-th degree masking equation using the k-th degree masking coefficients. At this time, a color cube is defined with respect to the first color components. The color cube thus defined is devided into an n number of blocks. The k-th degree masking coefficients are defined every respective blocks. Then, calculation of the k-th degree masking equation is performed using the k-th degree masking coefficients defined with respect to blocks involving points indicative of original density values within the color cube.

2 Claims, 8 Drawing Sheets

COLOR MODIFICATION UTILIZING TWO COEFFICIENTS

This application is a division of Ser. No. 320,306, now U.S. Pat. No. 4,975,769, filed Mar. 6, 1989.

FIELD OF THE ART

This invention relates to a method for color modification and an apparatus therefor, and more particularly to a method and an apparatus for color modification adapted for making such a color modification to represent a pictorial image represented with first three primary colors by using second three primary colors.

BACKGROUND ART

In the case of dealing with a color pictorial image as data, respective pixels forming that pictorial image are ordinarily represented by the combination of density values of three primary colors. In practice, for three primary colors used, various ones are used depending upon media for dealing with color pictorial image. For example, generally, for displaying a pictorial image on a CRT, etc., three primary colors of the R (Red), G (Green) and B (Blue) system are used, and in the case of printing three primary colors of the C (Cyan), M (Magenta) and Y (Yellow) system are used. In addition, even in the case of three primary colors of the same CMY system, they would become different colors, respectively, in dependence upon the hue peculiar to an ink used in a printing machine or a printer.

As just described above, for permitting the same pictorial image to be dealt with different media, it is required to make a color modification so as to become in conformity with the representation by the three primary colors peculiar to a media used. For such a color modification method, two approaches have been mainly put into practice up to now. The first approach is a method to define a color cube having coordinate axes of the three dimensional rectangular coordinate system on which density values of the three primary colors are taken, respectively, to store modified or corrected data into a storage unit corresponding to the color cube. Data which has not yet modified is used as an address value to provide an access to one point within the color cube defined in the storage unit to read out modified data memorized with respect to this point to thereby make a color modification. This method is disclosed, e g., in the Japanese Patent Publication No. 16403/77. However, when modified data are stored in respect of all the points within the color cube as stated above, an extensive memory capacity is required. For this reason, a high cost and large capacity memory unit must be prepared. To overcome this drawback, a method for reducing a necessary memory capacity to realize a reduced cost is disclosed in the Japanese Patent Publication No. 25416/80. In accordance with this method, modified data are stored only in respect of representative points within the color cube. Further, when intermediate values between adjacent representative points are needed, an interpolation operation is carried out. Moreover, in a method disclosed in the Japanese Patent publication No. 30222/80, for permitting the memory capacity to be further reduced, only data corresponding to differences between modified data and predetermined reference values are memorized instead of memorizing modified data themselves in regard to respective representative points.

The second approach for the color modification method is a method to use a masking equation. For example, for transforming a pictorial image of the RGB system to a pictorial image of the CMY system, a linear masking equation expressed by $$C = a_{11}R + a_{12}G + a_{13}B$$

$$M = a_{21}R + a_{22}G + a_{23}B$$

$$Y = a_{31}R + a_{32}G + a_{33}B$$

is used where R, G, B, C, M and Y are variables indicative of density values of primary colors, respectively, and $a_{11}$ to $a_{33}$ are called "linear or first degree masking coefficients", which are parameters to govern transformation, respectively. In this example, these nine parameters are set so that the pictorial image represented by the RGB system and the pictorial image represented by the CMY system are equivalent to each other. Ordinarily, nine parameters are determined by the ratio of the maximum densities of the three primary colors.

Color modification using the linear masking equation has been described as an example. In addition, a method using a quadratic equation to further reduce modification error is also known. In this method, quadratic or second degree terms of $R^2$, $G^2$ and $B^2$ and RG, GB and BR are introduced in the equation in addition to the linear terms of R, G and B. Ordinarily, by selecting several pixels as respective sampling pixels to perform an operation using the method of least squares so that an error between the representation of the RGB system and the representation of the CMY system is minimized, these nine parameters are set. It is to be noted that such a conventional color modification method is described in detail, e.g., in "Theory of Color Reproduction" by J. A. C. Yule (edited by the publication division of the Printing Society, 1971), and therefore, this material should be referred to in connection with this detail.

However, there are drawbacks encountered with these conventional color modification methods, respectively. In the case of the method by the first approach, i.e., the method of storing modified data into a storage unit corresponding to the color cube, when modified data are stored in respect to all the points within the color cube, an extensive memory capacity is required. For example, in the case of representing one color with a tone of 256 stages, it is required for color modification of the three primary colors to store data as large as those of $256^3$ sets into the storage unit. In addition, because core memory or semiconductor memory must be used for making a high speed access, cost of the memory unit becomes extremely high. To avoid this, when modified data are stored only in respect to representative points within the color cube, the interpolation operation is required, resulting in another problem that the high speed processing becomes difficult.

Also with the method by the second approach, i.e., the method using the masking equation, there is a problem as described below. First, since the color modification method using the linear masking equation is on the premises of the proportional rule indicating that the density ratio of the three primary colors of an ink should be maintained at the same value if the absolute value thereof is equally multiplied, and the additive rule indicating that the three primary color densities when superposition print is conducted should be equal to sum of densities of individual inks, sufficient color modification cannot be made. Especially, since the proportional rule and the additive rule are not both fully satisfied in actual media of the CMY system based on the substrative color mixture, even if color modification based on the linear masking equation is conducted, sufficient color reproducibility cannot be provided between the pictorial image in the medium before transformation and the pictorial image in the medium after transformation.

On the other hand, the conventional color modification method using the quadratic masking equation has a more improved color reproducibility as compared to the method using the linear masking equation, but has the problem that the equation becomes complicated, resulting in an elongated computational time.

DISCLOSURE OF THE INVENTION

A first object of this invention is to provide a color modification method and an apparatus therefor using a storage unit having as small a capacity as possible to permit high speed processing.

A second object of this invention is to provide a color modification method and an apparatus therefor using as simple an equation as possible to permit a sufficient color modification.

To achieve the above-described objects, this invention is characterized as follows.

The first feature of this invention resides in a color modification method for transforming a pictorial image comprising pixels represented by a combination of density values in respect of to a first color component to a pictorial image comprising pixels represented by a combination of density values in respect to a second color component, wherein an operation expressed below is implemented to an original density value P using two correction coefficients $\alpha$ and $\beta$ determined in advance to obtain a density value Q:

$$Q = \alpha P + \beta.$$

To implement the above method, the second feature of this invention resides in a color modifier comprising:

a reference table in which correction coefficients $\alpha$ and $\beta$ are stored, access means for reading out the correction coefficients $\alpha$ and $\beta$ from the reference table on the basis of a density value P, multiplier means for multiplying the density value P by the correction coefficient $\alpha$ read out, and adder means for adding the correction coefficient $\beta$ to the multiplied result to provide a density value Q.

The third feature of this invention resides in a color modification method for transforming a pictorial image comprising pixels represented by a combination (X, Y, Z) of density values of first three primary colors to a pictorial image comprising pixels represented by a combination (X, Y, Z) of density values of second three primary colors, the method comprising:

a stage for defining a color cube having coordinate axes of the three dimensional rectangular coordinate system on which density values (X, Y, Z) are taken, respectively, to divide the color cube into an n number of blocks, a stage for defining the k-th degree masking coefficients every n number of blocks, a stage for inputting pixel data represented by the density values, a stage for determining a block which involves points corresponding to the input pixel data on the color cube to take out the k-th degree masking coefficients, and a stage for transforming the input density values (x, y, z) to density values (X, Y, Z) by the calculation of the k-th degree masking coefficient taken out to output them.

To carry out the last-mentioned method, the fourth feature of this invention resides in a color modifier comprising:

a storage unit in which n sets of the k-th degree masking coefficients are stored, an input unit for inputting value of (x, y, z) as digital data, a masking coefficient readout unit for selecting one of the n sets of k-th degree masking coefficients on the basis of a predetermined higher order bit of the input digital data to read out it from the storage unit, and a computation unit for computing the k-th degree masking equation on the basis of the input values of (x, y, z) and the first degree masking coefficient read out to compute density values (X, Y, Z).

DETAILED DESCRIPTION OF THE PREFERRED EMBODIMENTS

Figure 1A:
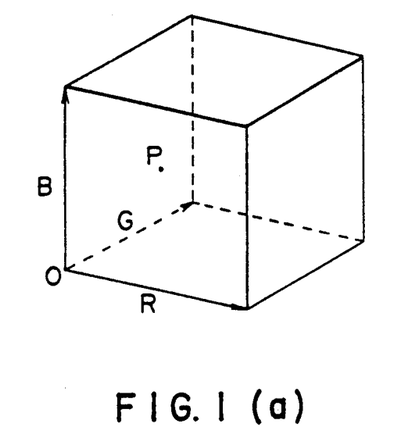
FIGS. 1(a) and 1(b) show a color cube defined with respect to first primary colors R, G and B and a color cube defined with respect to second primary colors C, M and Y, respectively.
Figure 1B:
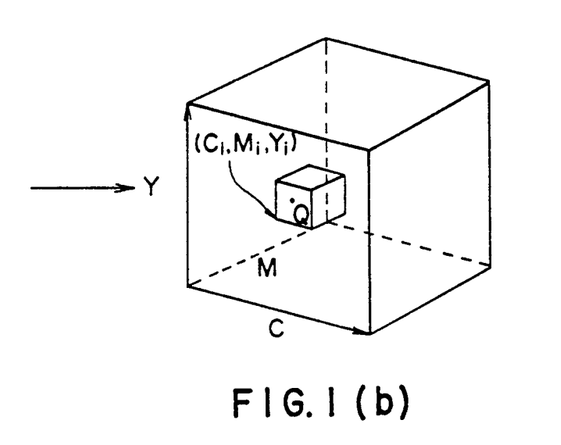

§1 Embodiment using correction coefficient 1.1 Principle of color modification Initially, the principle of a method of carrying out color modification using a color cube will be briefly described. FIG. 1(a) shows a first color cube defined with respect to first three primary colors R, G and B. The axes of the color cube indicate density values of respective primary colors, and one point P within the cube represents one color having three primary color density values corresponding to that coordinate position. FIG. 1(b) shows a second color cube similarly defined with respect to second primary colors C, M and Y. The color modification work carried out here is a work for allowing one point within the first color cube shown in FIG. 1(a) to correspond to one point Q within the second cube. In other words, this work can be said to be a work to give one point P having coordinate values (R, G, B) to provide one point Q having coordinate values (C, M, Y). It is to be noted that while the case of modifying a color of the RGB system to a color of the CMY system will be described as an example for the brevity of an explanation, the case of color modification of the same CMY system, e.g., the color modification from a color represented by three primary colors of (c, m, y) to a color represented by three primary colors of (C, M, Y) is entirely the same as the above.

Figure 2:
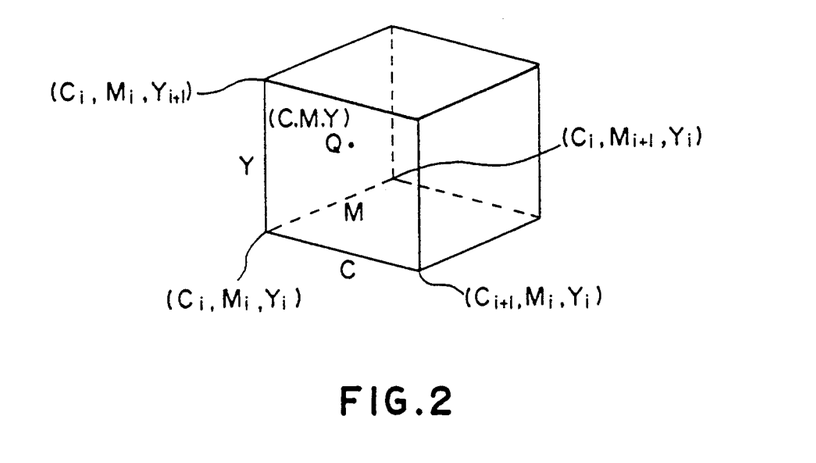
FIG. 2 is an enlarged view of one block within the color cube shown in FIG. 1 (b)

As described above, for memorizing corresponding points Q within the second color cube in respect to all the points P within the first color cube, respectively, an extensive memory is required. For this reason, a method of memorizing the correspondence relationship only in respect to representative points within the color cube is adopted. In practice, respective color cubes are divided into a plurality of blocks to establish a correspondence relationship with the blocks being respective units. For example, a block to which one point P of FIG. 1(a) belongs corresponds to a block having representative points (Ci, Mi, Yi) in FIG. 1(b). FIG. 2 is an enlarged view of this block.

Figure 3:
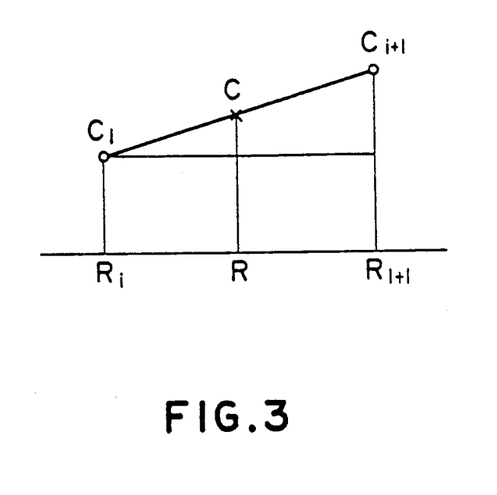
FIG. 3 is a diagram showing the principle of the interpolation calculation in a color modification method using a color cube.

Respective blocks have eight vertices as their representative points. Here, the coordinate values (C, M, Y) of one point Q will be determined by the interpolation calculation. For example, a coordinate value C on the C axis of the point Q is calculated on the basis of a coordinate value R on the R axis of the point P. FIG. 3 is a view showing the principle of this interpolation calculation. Coordinate values $R_i$ and $R_{i+1}$ are given as respective representative points within the first cube, and coordinate values $C_i$ and $C_{i+1}$ are given as the coordinate values on the C axis within the second. Here, the coordinate value C corresponding to the coordinate value R is determined by a linear approximation as defined below.

$$(R-R_i)/(R_{i+1}-R_i)=(C-C_i)/(C_{i+1}-C_i) \quad (1)$$

The change of this equation gives $$C=(C_{i+1}-C_i)/(R_{i+1}-R_i)\times(R-R_i)+C_i \quad (2)$$

Further derivation gives $$C=(C_{i+1}-C_i)/(R_{i+1}-R_i)\times R-(C_{i+1}-C_i)/(R_{i+1}-R_i)\times R_i+C_i \quad (3)$$

It is now assumed that two correction coefficients $\alpha_i$ and $\beta_i$ are defined as follows.

$$\alpha_i=(C_{i+1}-C_i)/(R_{i+1}-R_i) \quad (4)$$

$$\beta_i=C_i-(C_{i+1}-C_i)/(R_{i+1}-R_i)\times R_i \quad (5)$$

Since the coordinate values $R_i$, $R_{i+1}$, $C_i$ and $C_{i+1}$ of the representative points are all known values, respectively, the correction coefficients $\alpha_i$ and $\beta_i$ are constants known in advance. Here, replacing the equation (3) with the equations (4) and (5) gives $$C=\alpha_i\times R+\beta_i \quad (6)$$

In completely the same manner as the above, the following equations are provided.

$$M=\alpha_j\times G+\beta_j \quad (7)$$

$$Y=\alpha_k\times B+\beta_k \quad (8)$$

where i, j and k denote representative numbers in directions of R-, G- and B- axes, respectively, wherein when the color cube is divided into n sections every respective axes to form blocks, the relationship expressed as $1\geq i, j, k\geq n$ holds. The principle of this invention is to determine in advance two correction coefficients $\alpha$ and $\beta$ every representative points in respective axes as stated above to calculate the values of (C, M, Y) from the given values of (R, G, B).

1.2 Embodiment of a color modifier

Figure 4:
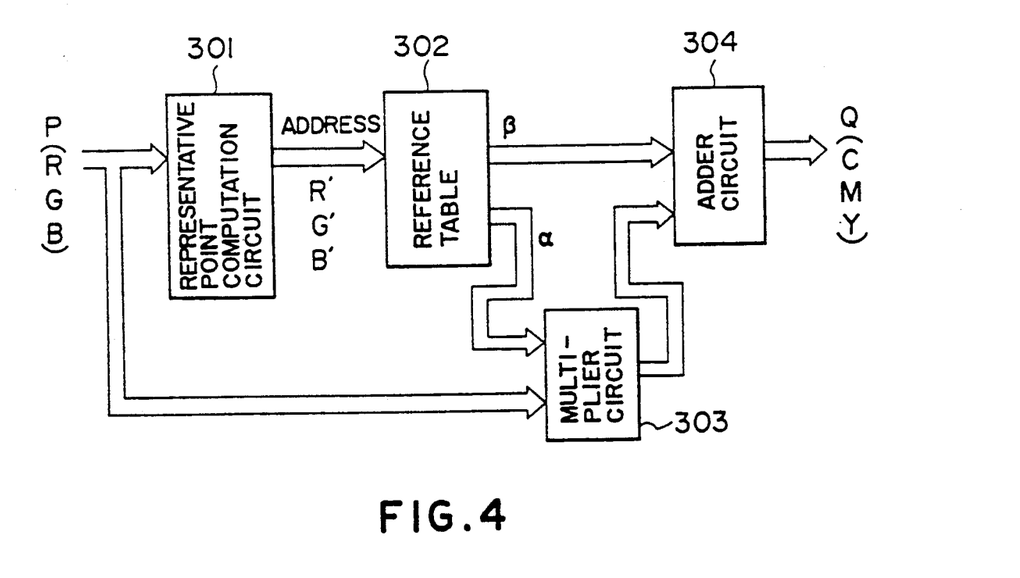
FIG. 4 is a block diagram showing an embodiment using a correction coefficient of a color modifier according to this invention.

An embodiment of a color modifier using the above-described principle is shown in FIG. 4. This color modifier has a function to transform one point P (R, G, B) within the first color cube to one point Q (C, M, Y) within the second color cube. This color modifier comprises a representative point computation circuit 301 for inputting data R, G and B in respect to the point P, a reference table 302 in which correction coefficients $\alpha$ and $\beta$ are memorized, a multiplier circuit 303 for multiplying uncorrected density values R, G and B by correction coefficient $\alpha$, and an adder circuit 304 for adding correction coefficient $\beta$ to output values of the multiplier circuit 303. The output values of the adder circuit 304 serve as respective corrected density values C, M and Y to be obtained.

Now, consideration is taken in correction with the case where density values R, G and B are given as digital data of 8 bits, respectively, to calculate density values C, M and Y having digital data of 8 bits on the basis of the given density values. The representative point calculation circuit 301 calculates representative points (R', G', B') on the basis of the three 8 bits data (R, G, B) to provide an access to the reference table 302 with these representative points being as respective address values. In this embodiment, the representative computation circuit 301 extracts the higher order 4 bits from the input 8 bit data to output them as the representative point data. Accordingly, the representative point data (R', G', B') are data of the higher order 4 bits of the input density values (R, G, B), respectively, wherein the relationship expressed as $0\leq R', G', B'\leq 15$ holds. Since an access to the reference Table 302 is made with the three representative point data (R', G', B') being as respective address values, the reference table 302 will have addresses of $16^3=4096$. Into these 4096 addresses, values of correction coefficients $\alpha_{R'}$ $\beta_{G'}$ $\alpha_{B'}$ $\beta_{R'}$ $\beta_G$ and $\beta_B$ are stored, respectively. When it is now assumed that specified correction coefficients $\alpha_{i'}$ $\alpha_j$ $\alpha_k$ $\beta_{i'}$ $\beta_j$ and $\beta_k$ are read out from respective specified addresses, $\alpha_{i'}$ $\alpha_j$ and $\alpha_{k'}$ and $\beta_{i'}$ $\beta_j$ and $\beta_k$ thereamong are delivered to adder circuits 303 and 304, respectively. In the multiplier circuit 303, multiplications of values of (R, G, B) by respective values of ($\alpha_{i'}$ $\alpha_j$ $\alpha_k$) corresponding thereto are performed. Namely, computations of the first terms in respective right sides of the equation (6) to (8) are performed. Subsequently, additions of these computed results and correction coefficients $\beta_{i'}$ $\beta_j$ and $\beta_k$ are carried out in the adder circuit 304. Namely, computations of the right sides of the equations (6) to (8) are performed. Thus, values of (C, M, Y) are calculated as outputs of the adder circuit 304.

In this apparatus, it is sufficient to use a memory unit having the order of 4096 addresses at most for the reference table 302. In addition, since the interpolation includes only multiplication and addition, the computation time may be very short by performing computation by hardware such as for example, multiplier circuit 303 and adder circuit 304, etc. Accordingly, high accurate color modification can be carried out at a low cost and at a high speed.

§2 Embodiment using a masking equation

2.1 Principle of color modification

The color modification according to this embodiment is made by the computation based on the k-th degree masking equation. In the conventional method, only a single set of data were used for the k-th degree masking coefficients used in the k-th degree masking equation. On the contrary, in this invention, a plurality of sets of the k-th degree masking coefficients are provided in advance to selectively use an optimum set depending upon a combination to input density values. Namely, the color cube in respect of the three primary colors is divided into a plurality of blocks to determine a correspondence relationship between points plotted on the color cube on the basis of the input density values and points within the blocks thus divided to thereby select a combination of the k-th degree masking coefficient.

Particularly, when the linear masking equation obtained by setting k to 1 is used, the formulation used for color modification becomes simple and satisfactory color modification can be made because the linear masking coefficient optimally selected are used.

2.2 Procedure of actual color modification

Figure 5:
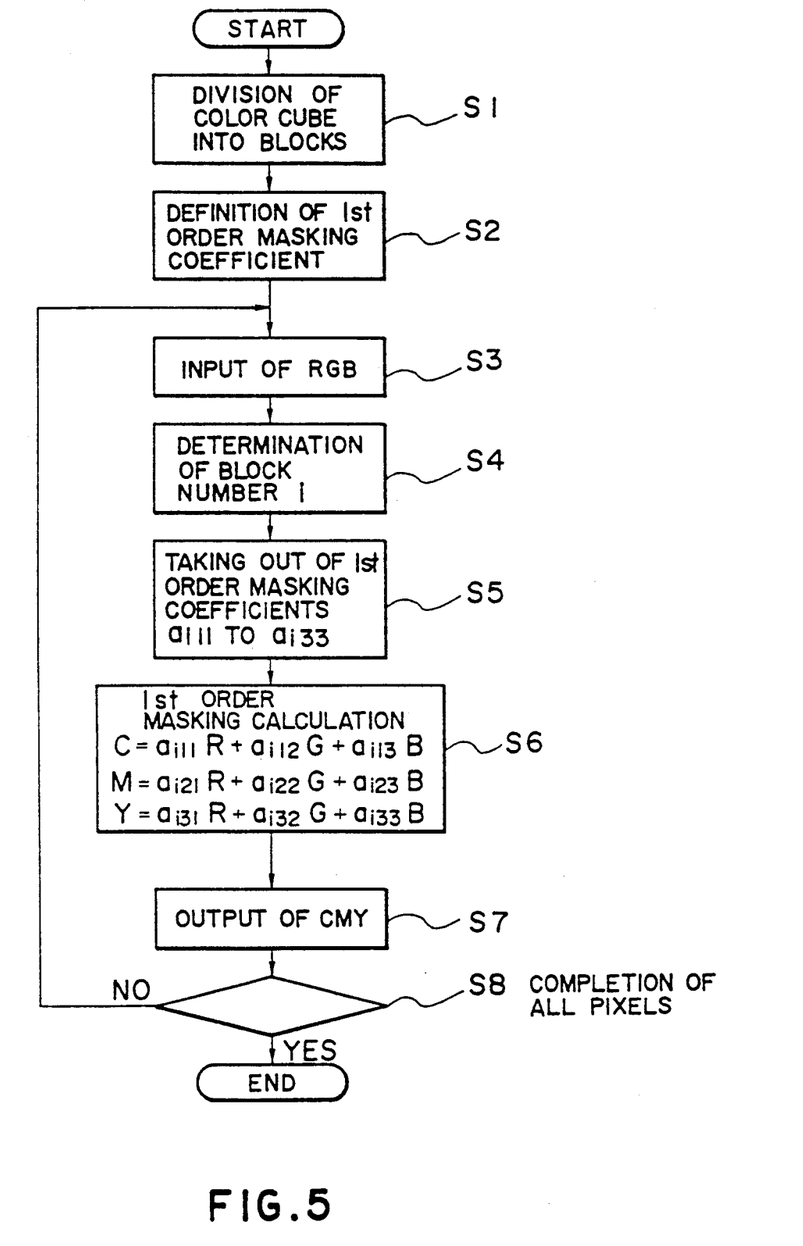
FIG. 5 is a flowchart showing an actual procedure of a color modification method using a masking equation according to this invention.
Figure 6:
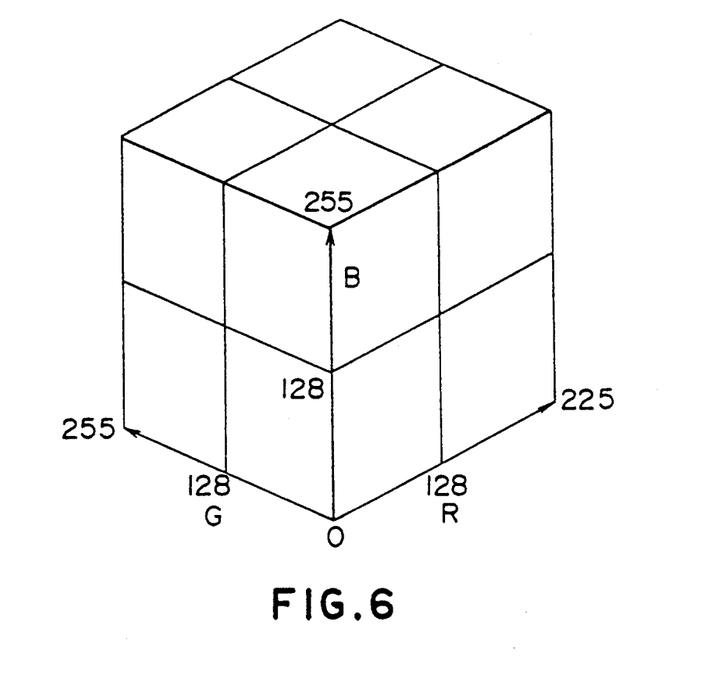
FIG. 6 is a view showing an example of a division of blocks of the color cube in the method shown in FIG. 5, FIGS. 7 and 8 are block diagrams showing embodiments of a color modifier for carrying out the color modification method using the masking equation shown in FIG. 5, respectively.

The procedure of an actual color modification will be described in accordance with the drawings. FIG. 5 is a flowchart showing the procedure of a color modification method according to this embodiment. In this embodiment, the case of transforming a pictorial image represented by three primary colors of RGB to a pictorial image represented by three primary colors of CMY is taken as an example. First, in step S1, color cube is divided into blocks. The color cube in this case is a cube defined by the three dimensional rectangular coordinate system in which R, G and B are taken on the orthogonal axes, respectively. It is now assumed that when one pixel is represented by the density values (R, G, B) and respective density values take values of 0 to 255, one pixel will be represented by any one point within the color cube shown in FIG. 6. It is now assumed that the color cube is equally divided as shown in FIG. 6 to provide eight blocks divided. When such a division is made, a certain pixel will belong to any one of eight blocks.

Subsequently, in step S2, defamation of the linear 1st degree masking coefficients is made. Here, the important point is to define independent coefficients in connection with respective eight blocks. Namely, for the i-th block, nine coefficients of $a_{i11}$, $a_{i12}$, $a_{i13}$, $a_{i21}$, $a_{i22}$, $a_{i23}$, $a_{i31}$, $a_{i32}$ and $a_{i33}$ are defined. Further, 72 coefficients are defined in total for i=1 to 8 of the above respective nine coefficients. These coefficients may be determined by the application of the least square method every respective block in the same manner as in the conventional method. Namely, for the i-th block, it is sufficient to take out several colors represented by one point within the i-th block as a sample to determine nine coefficients for the i-th block so that the difference between the representation by RGB and the representation by CMY in respect to the same sample is minimized.

The steps up to the step S2 are a preparatory stage. When the preparatory stage up to this has been completed, it is possible to actually implement color modification to the pictorial image of the RGB system to transform it to the pictorial image of the CMY system. Such a transformation is carried out with each pixel constituting the pictorial image being as a unit.

Initially, in step S3, density values (R, G, B) in respect to a certain pixel are input. Subsequently, in step S4, a block number i is determined on the basis of the input density values (R, G, B). As described above, one point within the color cube shown in FIG. 6 is specified by the values of (R, G, B). Thus, block number i to which that point belongs is determined.

Next, in step S5, nine coefficients $a_{i11}$ to $a_{i33}$ in respect to the i-th block are taken out. Then, these nine coefficients are used to perform a computation using the linear masking equation expressed below, to thus obtain density values (C, M, Y). These density values are output at step S7.

$$C = a_{i11} R + a_{i12} G + a_{i13} B \qquad (9)$$

$$M = a_{i21} R + a_{i22} G + a_{i23} B \qquad (10)$$

$$Y = a_{i31} R + a_{i32} G + a_{i33} B \qquad (11)$$

By the above-described procedure, color modification in respect to one pixel is completed. When similar procedures are repeatedly applied to all pixels (step S8), the pictorial image of the CMY system can be obtained from the pictorial image of the RGB system.

2.3 Embodiment of a color modifier

Figure 7:
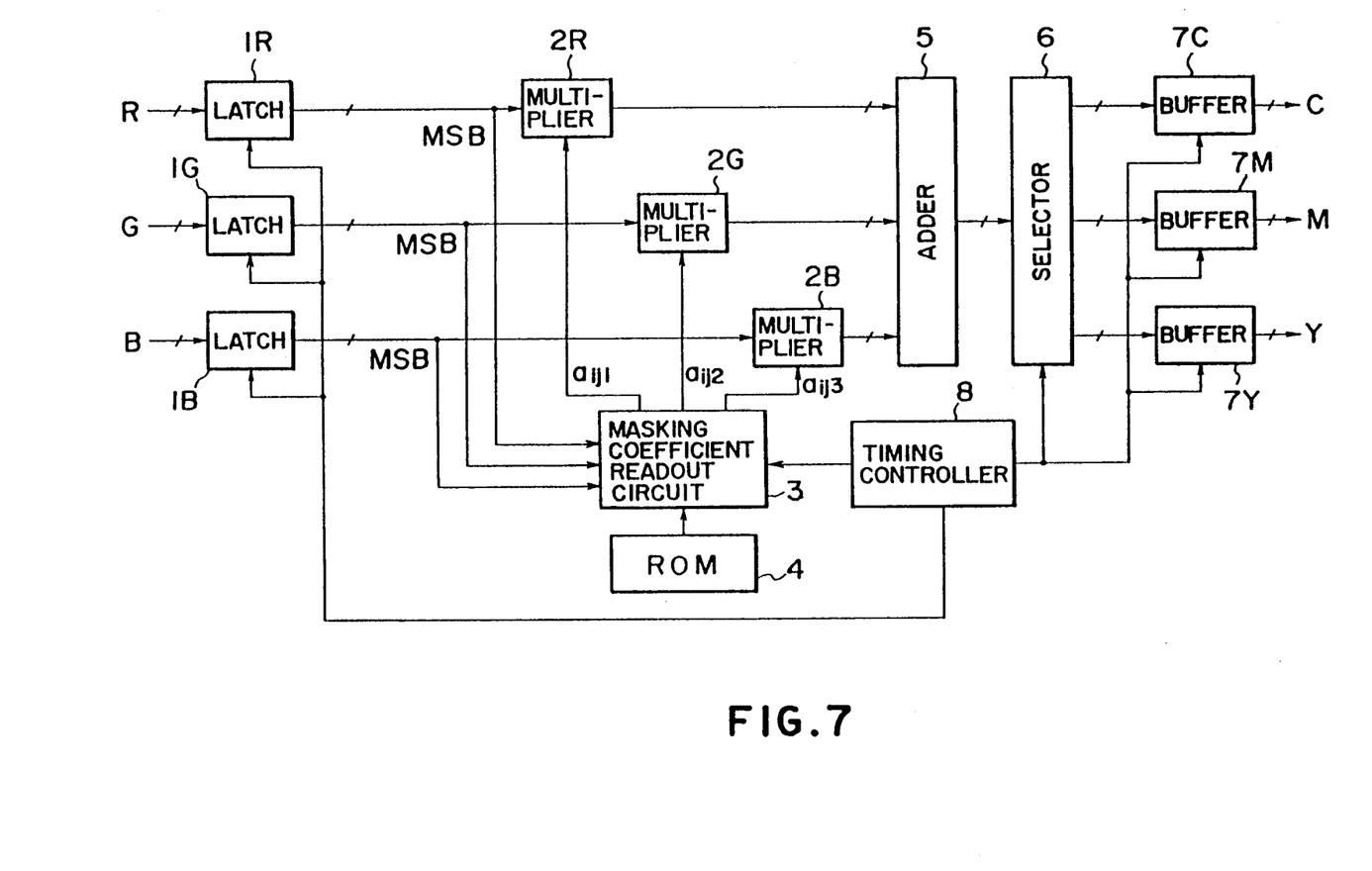

FIG. 7 is a block diagram of a color modifier for making color modification by the above-described method. The input density values (R, G, B) are latched at latch circuits 1R, 1G and 1B and are then delivered to multipliers 2R, 2G and 2B, respectively. The density values (R, G, B) are digital values having values of 0 to 255, respectively, and are represented by data of 8 bits. Respective Most Significant Bits (MSBs) of the data are delivered to a masking coefficient readout circuit 3. The masking coefficient readout circuit 3 is a circuit for reading out the first degree masking coefficients memorized in a ROM 4. In the ROM 4, eight sets of the first degree masking coefficients are memorized. The i-th set (i=1 to 8) coefficients are memorized. The i-th set (i=1 to 8) consists of nine coefficients of $a_{i11}$, $a_{i12}$, $a_{i13}$, $a_{i21}$, $a_{i22}$, $a_{i23}$, $a_{i31}$, $a_{i32}$ and $a_{i33}$. The nine coefficients read out from the masking coefficient readout circuit 3 are delivered to multipliers 2R, 2G and 2B in three installments every three coefficients. Namely, coefficients $a_{ij1}$, $a_{ij2}$, and $a_{ij3}$ are delivered to multipliers 2R, 2G and 2B, respectively, where j changes from 1 to 3 in sequence. These multipliers 2R, 2G and 2B multiply the input R, G and B by the coefficients $a_{ij1}$, $a_{ij2}$ and $a_{ij3}$ delivered from the masking coefficient readout circuit 3, respectively. The products thus obtained are added to each other by the adder 5. The sum output from the adder 5 is delivered to a selector 6. The selector 6 delivers the input sum to any one of buffers 7C, 7M and 7Y on the basis of the value of j in the masking coefficient readout circuit 3. Namely, in the respective cases where j=1, 2, 3, sums are delivered to buffers 7C, 7M and 7Y, respectively. Thus, the final density values (C, M, Y) are output from the buffers 7C, 7M and 7Y. A timing controller 8 has a function to control the entirety of the above-described color modifier while changing the value of j so that it takes 1, 2 and 3 in succession.

With the color modifier thus constructed, the procedure of the steps S3 up to S7 shown in FIG. 5 can be carried out. Namely, inputting at step S3 is carried out at latch circuits 1R, 1G and 1B. Determination of the block number i at the subsequent step S4 and taking out of the masking coefficient at the step S5 are carried out by the masking coefficient readout circuit 3. To the masking readout circuit 3, MSBs of R, G and B are delivered. These MSBs correspond to information indicating whether respective coordinate values are above or below 128 in the color cube shown in FIG. 6. Accordingly, one of eight blocks can be specified by information of 3 bits comprised of respective MSBs of R, G and B.

The computation of the linear masking equation at step S6 is performed by multipliers 2R, 2G and 2B, adder 5, and selector 6. Namely, when the timing controller 8 give an instruction of $j=1$, $a_{i11}$, $a_{i12}$ and $a_{i13}$ are output from the masking coefficient readout circuit 3, and a value expressed below is output from the adder 5:

$$a_{i11} R + a_{i12} G + a_{i13} B$$

The selector 6 delivers this result to the buffer 7C. This processing is to perform a computation expressed below:

$$C = a_{i11} R + a_{i12} G + a_{i13} B.$$

Similarly, the value M is determined by the computation by $j=2$, and the value Y is determined by the computation by $J=3$. as just described above, density values C, M and Y are respectively subjected to time division and are computed in order. The computation in respect to one pixel has been described. Such computations will be repeated in respect to all pixels.

2.4 Another embodiment of a color modifier

Figure 8:
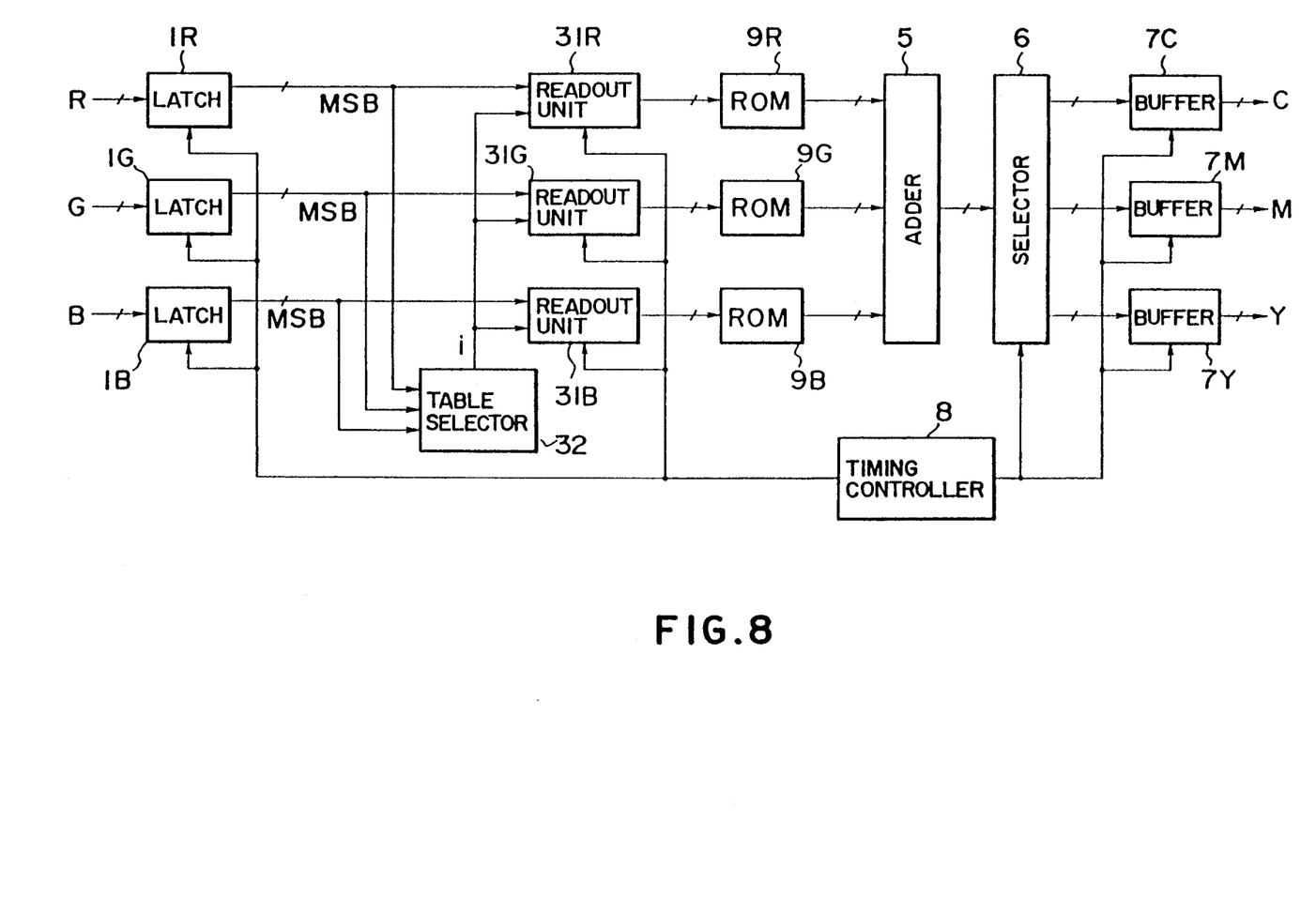

FIG. 8 is a block diagram of a color modifier according to a further different embodiment of this invention wherein the same components as those in the color modifier of FIG. 7 are designated by the same reference numerals, respectively, and their explanation will be omitted. In the color modifier of FIG. 7, there was adopted the scheme to memorize 72 masking coefficients into ROM 4 to read them out by masking coefficient readout circuit 3 to perform multiplication thereof at multipliers 2R, 2G and 2B. Contrary to this, the color modifier of FIG. 8 is adapted to memorize in advance multiplied results in respect of all values into ROM as a table to make reference to the table to thereby provide products without executing multiplication.

The above-described table is memorized in ROMs 9R, 9G and 9B. These ROMs are addressed by readout units 31R, 31G and 31B, respectively. After density values (R, G, B) are latched, they are delivered to respective readout units 31R, 31G and 31B. Moreover, Most Significant Bits (MSBs) of respective density values are delivered to a table selector 32. The ROMs 9R, 9G and 9B memorize eight sets of tables, respectively, thus to select one of eight sets of tables on the basis of a given MSB.

Figure 9:
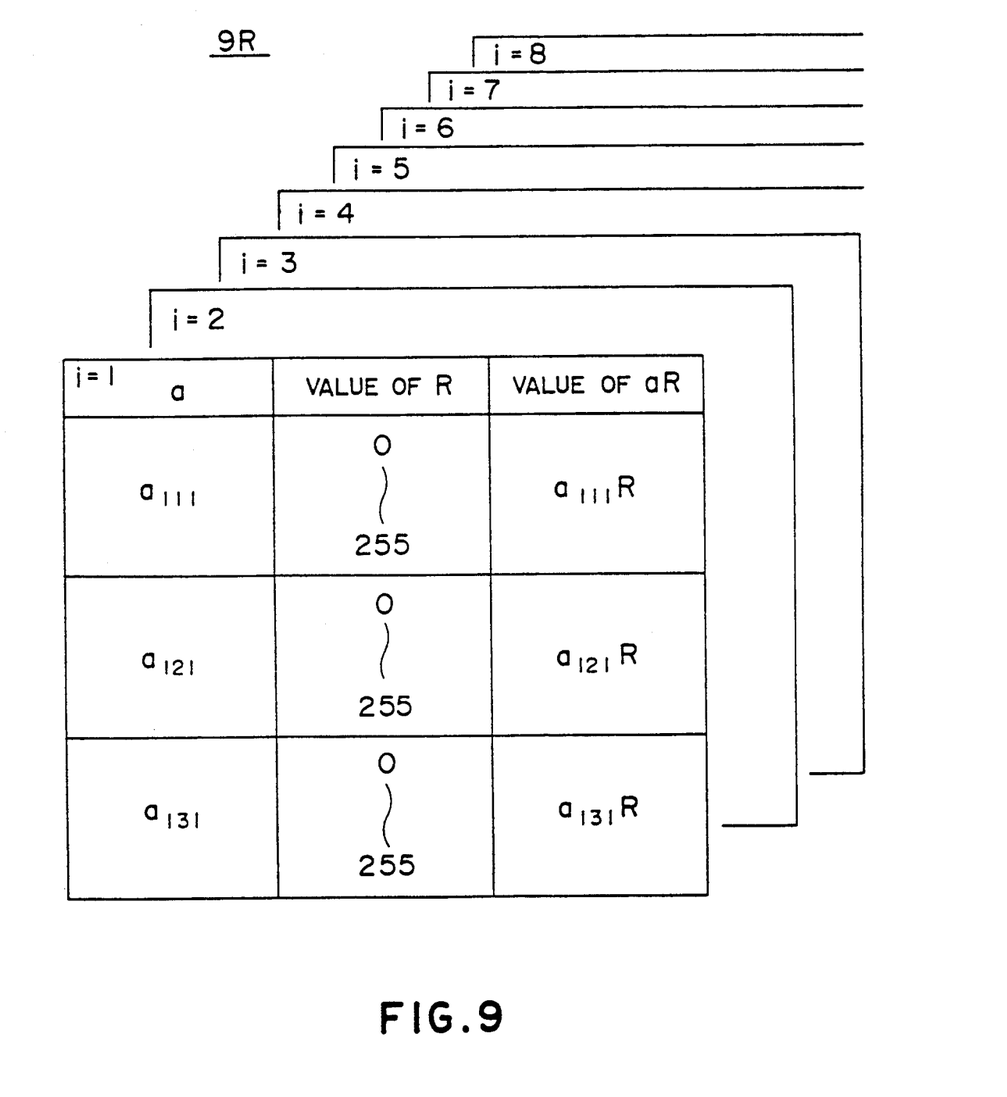
FIG. 9 is a view showing the table used in the color modifier shown in FIG. 8.

FIG. 9 is a view showing the contents of eight sets (i = 1 to 8) of tables memorized in ROM 9R of the color modifier shown in FIG. 8. In the i-th table, products obtained by multiplying the 1st degree masking coefficients $a_{i11}$, $a_{i21}$ and $a_{i31}$ by density value R are memorized.

For example, in the first table shown, products of $a_{i11}$, $a_{i21}$ and $a_{i31}$ and density value R are memorized in respect of all R values (R=0 to 255). Accordingly, when the number of i of table and a specified density value $R_p$ are delivered to ROM 9R, products $a_{i11} R_p$, $a_{i21} R_p$ and $a_{i31} R_p$ are output from ROM 9R in the order recited. The output timing is controlled by timing controller 8. Similarly, eight sets of tables are memorized into ROMs 9G and 9B, respectively. In the i-th table within the ROM 9G, products $a_{i12}$ G, $a_{i22}$ G and $a_{i32}$ G are recorded in respect to all G values. Further, in the i-th table within the ROM 9B, products $a_{i13}$ B, $a_{i23}$ B and $a_{i33}$ B are recorded in respect to all B values.

As described above, MSBs of density values (R, G, B) are delivered to the table selector 32. Thus, since it is possible to determine what block of the color cube shown in FIG. 6 the density value concerned belongs to, a table corresponding to that block can be selected. Namely, the table selector 32 can output the table number i. Respective readout units 31R, 31G and 31B address the i-th tables within the ROMs 9R, 9G and 9B by the density values R, G, and B. Thus, products $a_{i11}$ R, $a_{i21}$R and $a_{i31}$ R are output from the ROM 9R in the order recited. Similarly, products $a_{i12}$ G, $a_{i22}$ G and $a_{i32}$ G are output from the ROM 9G in the order recited. In addition, products $a_{i13}$ B, $a_{i23}$ B and $a_{i33}$ B are output from the ROM 9B in the order recited. Since the adder 5 adds respective ROM outputs on a time series basis, C, M and Y will be output in order recited on the basis of the above-mentioned linear masking equation.

The color modifier of FIG. 8 requires a ROM having a capacity larger than that of the color modifier of FIG. 7, but can perform high speed operation because no multiplier is used.

Figure 10:
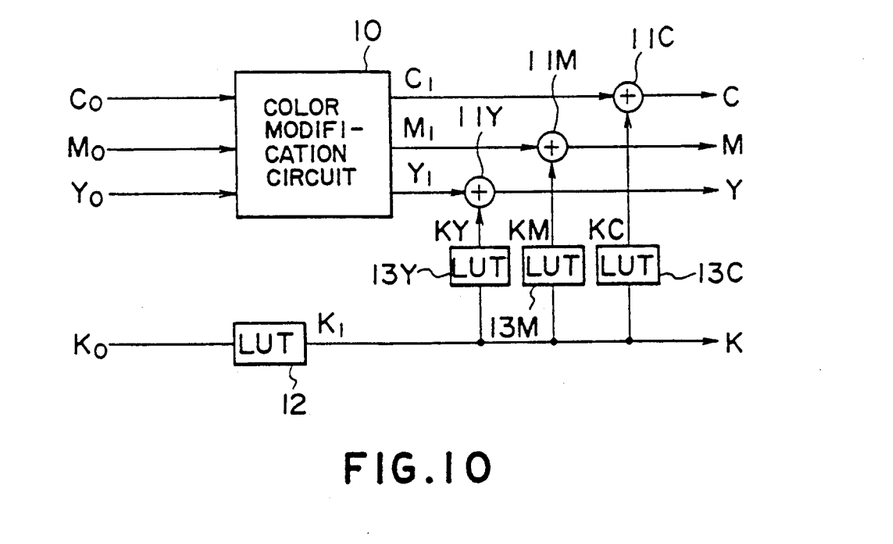
FIG. 10 is a block diagram of a four color modifier in which the color modifier shown in FIG. 7 is applied to color modification of four color pictorial image.

§3 Embodiment for Making Color Modification of Four Colors 3.1 Four color modifier The case of transforming a pictorial image of the RGB system to a pictorial image of the CMY system described in S1 and S2 is applicable to image transformation between pictorial images of the same CMY system and shown in FIG. 10. In this embodiment, the fourth color component is added as K (black) in addition to the three primary colors of CMY, thus to constitute a four color modifier. Namely, pixels represented by four color components of Co Mo, Yo and Ko are transformed to pixels represented by four color components of C, M, Y and K to make color modification.

A need of making such a color modification occurs, e.g., in the case where Co, Mo, Yo and Ko are colors based on the printing ink and C, M, Y and K are colors based on the color printer. Because cyan Co of the printing ink and cyan C of the color printer are different in their tone of color even when an attention is paid to the same cyan color, even if image data for printing is delivered to the color printer as it is, a difference of color tone would occur therebetween. For this reason, it is required to apply color modification to image data for printing (represented by density values Co, Mo, Yo and Ko) to provide image data for the color printer (represented by density values C, M, Y and K).

In the four color modifier shown in FIG. 10, a color modifier 10 is an apparatus having an arrangement shown in FIG. 7. Accordingly, density values (Co, Mo, Yo) of input three primary colors are transformed to density values ($C_1$, $M_1$, $Y_1$) and are then delivered to adders 11C, 11M and 11Y. It is to be noted that because this color modification is implemented only to the three primary colors, it is required to add color modification in respect of Ko which is the fourth color thereto. To realize this, density value Ko is first delivered to a look-up table 12 to obtain density value $K_1$. This look-up table 12 is a table for providing density value $K_1$ having a one-to-one correspondence relationship with respect to the input density value Ko. Further, this density value $K_1$ is delivered to the respective look-up table 13C, 13M and 13Y to obtain correction values KC, KM and KY to add correction values KC, KM and KY to density values ($C_1$, $M_1$, $Y_1$) at adders 11C, 11M and 11Y to obtain density values (CMY) in which color modification in respect to the density values Ko is taken into account. With such an arrangement, the color modification method in respect to the three primary colors according to this invention can be applied to color modification for four colors or more.

3.2 Example applied to a printer

Figure 11:
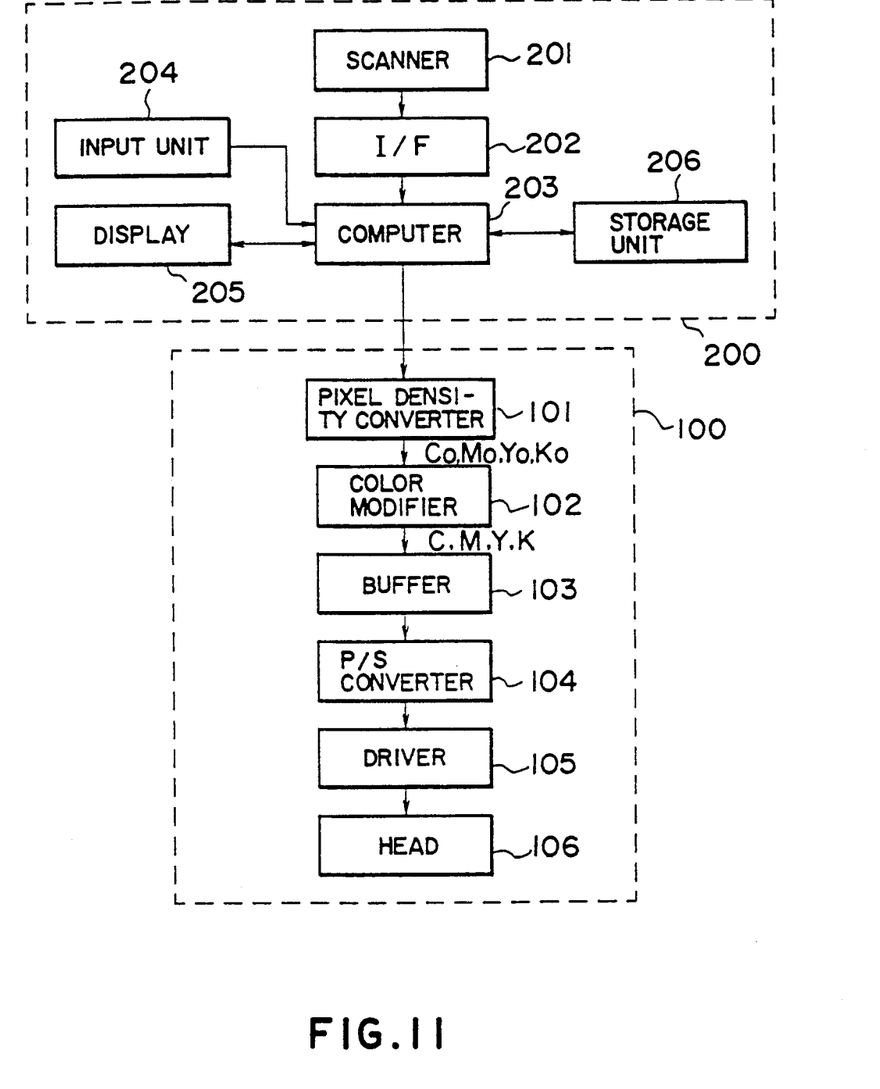
FIG. 11 is a block diagram showing an applied example in which the color modifier shown in FIG. 10 is assembled within a color printer.

An applied example of the four color modifier shown in FIG. 10 is illustrated in FIG. 11. In this applied example, the above-described four color modifier is assembled in a sublimation transfer type color printer 100. An original picture prepared by a layout scanner 200 can be obtained as a hard copy by the color printer 100. In the layout scanner 200, a pictorial image on the film is scanned by a scanner 201. Thus, the pictorial image data is taken into a computer 203 through an interface 202. An operator carries out the works for layout of input pictorial image, modification thereof, and the like by using an input unit 204. The pictorial image thus laid out is displayed on a display 205 and the pictorial image data is memorized into a storage unit 206.

Actual printing is carried out by taking out pictorial image data in the storage unit 206 through the computer 203 to prepare a film block form on the basis of the pictorial image data. It is convenient to confirm whether or not a desired printed result is surely obtained prior to implementation of actual printing. For this confirmation, a hard copy by the color printer 100 can be utilized. When an attempt is made to provide a hard copy on the basis of the pictorial image data in the memory unit 206 to confirm the presence and absence of points to be modified while observing this hard copy output, modification can be made prior to entering the printing process. However, as described above, even if the same pictorial image data in the storage unit 206 are used, an actual printed result and a hard copy result obtained by the color printer 100 differ from each other in their tone of color. To overcome this, a scheme is employed to assemble the color modifier according to this invention into color printer 100, thereby allowing the color tone of a hard copy obtained by color printer 100 to be in correspondence with the color tone of an actual printed matter.

Namely, pictorial image data in the storage unit 206 is delivered to a pixel density converter 101 through computer 203, at which conversion processing of pixel density in conformity with the resolution of the printer is carried out. The pictorial image data delivered from the pixel density converter 101 correspond to density values Co, Mo and Yo input to the apparatus of FIG. 10. A four color modifier 102 is a four color modifier according to this invention shown in FIG. 10. In this color modifier, input density values Co, Mo, Yo and Ko are respectively transformed to density values C, M, Y and K and are then output. Such output data are temporarily stored in a buffer 103 and are then converted to serial data at a parallel-to-serial converter 104. The serial data thus obtained is converted to a predetermined drive current at a driver 105 and is then delivered to a head 106 of the printer.

§4 Other Embodiments

While this invention has been explained on the basis of several embodiments, this invention is not limited to these embodiments, but can be carried out in other various modes. For example, for the three primary colors subject to modification, any three primary color system may be adopted. While the embodiments for carrying out transformation from the three primary colors of the RGB system to the three primary colors of the CMY system have been described in S1 and S2, this invention may be similarly applied to transformation to the same RGB system or the same CMY system. Moreover, the color cube may be divided not only into eight blocks, but also into an arbitrary number of blocks.

Further, while the embodiment in connection with color modification using the linear masking equation has been illustrated in S2, this invention may be similarly applied to general color modification using the k-th degree masking equation. In this case, it is sufficient to prepare n sets of the k-th degree masking equations respectively. For an example of the k-th degree masking equation, the case of the quadratic masking equation is shown below.

$$C = a_{10} + a_{11}R + a_{12}G + a_{13}B + a_{14}RG + \\ a_{15}GB + a_{16}BR + a_{17}R^2 + a_{18}G^2 + a_{19}B^2, \quad (12)$$

$$M = a_{20} + a_{21}R + a_{22}G + a_{23}B + a_{24}RG + \\ a_{25}GB + a_{26}BR + a_{27}R^2 + a_{28}G^2 + a_{29}B^2, \quad (13)$$

and $$Y = a_{30} + a_{31}R + a_{32}G + a_{33}B + a_{34}RG + \\ a_{35}GB + a_{36}BR + a_{37}R^2 + a_{38}G^2 + a_{39}B^2 \quad (14)$$

where R, G, B, C, M and Y are density values of respective primary color, and $a_{10}$ to $a_{39}$ are masking coefficients, respectively. A masking coefficient or coefficients which take a value of zero may be included in these masking coefficients. In the above equations, $a_{10}$, $a_{20}$ and $a_{30}$ are constant terms, respectively. In general, as the degree K is increased, higher fidelity color modification can be made, and as the number n of divisions is increased, higher fidelity color modification can be made. Accordingly, when K and n are both increased, extremely high fidelity color modification can be made by the multiplication effect of both factors.

In addition, in the application to the printer shown in FIG. 11, a color modifier using correction coefficients stated in S1 may be utilized for color modifier 102.

UTILIZABILITY IN INDUSTRY

This invention can be widely utilized for color modification of a color modification representing respective pixels with the combination of a plurality of color components. For example, this invention can be utilized for allowing various display units to display a pictorial image of an appropriate color tone, or for allowing various printers to print out a pictorial image of an appropriate color tone.

What is claimed is:

1. A color modifier system for transforming a first pictorial image comprising pixels represented by a combination of density values corresponding to a first color component to a second pictorial image comprising pixels represented by a combination of density values corresponding to a second color component, said system comprising:

image inputting means for gathering said first pictorial image;

storing means for storing a reference table in which two correction coefficients $\alpha$ and $\beta$ defined with respect to the density values corresponding to said first color component are stored into addresses corresponding to said density values;

access means for providing access to said reference table on the basis of a density value P corresponding to said first color component to read out said correction coefficients $\alpha$ and $\beta$;

multiplier means for multiplying the density value P by said correction coefficient $\alpha$ read out from said reference table;

adder means for adding said correction coefficient $\beta$ read out from said reference table to the multiplied result of said multiplier means, wherein an added result of said adder means is output as a density value Q for said second color component; and image outputting means for outputting said second pictorial image.

2. The color modifier system of claim 1, wherein the density value P is represented by n bits of digital data and the access means accesses the reference table with higher order m bits of the density value P, wherein m is $<n$.

* * * * *